United States Patent [19]

Epple

[11] Patent Number: 5,084,317
[45] Date of Patent: Jan. 28, 1992

[54] PRESSURE-SENSITIVE ADHESIVE RELEASE LINER

[75] Inventor: Thomas C. Epple, Madison, Ohio

[73] Assignee: Avery Dennison Corporation, Pasadena, Calif.

[21] Appl. No.: 348,719

[22] Filed: May 8, 1989

[51] Int. Cl.⁵ ............................ B32B 7/06; B32B 7/12
[52] U.S. Cl. ........................................ 428/40; 428/86; 428/95; 428/352; 428/354; 428/447
[58] Field of Search .............. 428/40, 352, 86, 95, 428/100, 447, 354

[56] References Cited

U.S. PATENT DOCUMENTS

| | | | |
|---|---|---|---|
| 2,343,930 | 3/1944 | Rowe | 18/55 |
| 2,986,777 | 6/1961 | Carter | 18/56 |
| 4,331,628 | 5/1982 | Ziegler | 264/553 |
| 4,350,551 | 9/1982 | Michaelson | 156/245 |
| 4,405,668 | 9/1983 | Wald | 428/40 |
| 4,443,507 | 4/1984 | Yamada et al. | 428/114 |
| 4,708,896 | 11/1987 | Akao | 428/35 |
| 4,713,273 | 12/1987 | Freedman | 428/40 |
| 4,728,571 | 8/1988 | Clemens et al. | 428/352 |
| 4,751,121 | 6/1988 | Kühnel et al. | 428/40 |
| 4,769,283 | 9/1988 | Sipinen et al. | 428/352 |

Primary Examiner—Merrell C. Cashion, Jr.
Assistant Examiner—D. S. Nakarani
Attorney, Agent, or Firm—Pearne, Gordon, McCoy & Granger

[57] ABSTRACT

A release liner comprising a thermoplastic film having a release surface including a cured silicone coating for use in moldable pressure-sensitive adhesive fastening tapes and laminates including a moldable or formable layer. The rheological properties of the thermoplastic film at elevated temperatures are used to achieve mold conformability and retention of uniform release characteristics.

21 Claims, 1 Drawing Sheet

PRESSURE-SENSITIVE ADHESIVE RELEASE LINER

BACKGROUND OF INVENTION AND PRIOR ART

The present invention relates to release liners comprising a thermoplastic film having a cured silicone coating which provides a liner release surface, moldable pressure-sensitive adhesive fastening tapes including such release liners and to the use of the release liners and tapes in laminates including a moldable or formable layer which may be molded by application of heat and pressure.

The release liner may be used to protect or cover a surface of the laminate to be molded. The release liner is particularly useful in the molding of laminates including a formable layer comprising a flat workpiece or sheet material blank and a pressure-sensitive adhesive layer having an outer surface covered by the release liner. Of course, the laminate may be provided by the combination of a formable layer and a fastening tape comprising the pressure-sensitive adhesive layer and release liner. The desired degree of adhesion or releasability of the liner is provided by the silicone coating on the release surface of the liner. In such molding applications, it is necessary to achieve both good mold conformability and retention of uniform releasability.

In present practice, the release liner does not itself consist of a moldable material and the liner may tend to assume a non-conforming shape which includes wrinkles or folds. Poor mold conformability is encountered in the molding of complex shapes as well as even relatively simple shapes involving non-uniform extension of portions of the laminate. Typically, release liners including a paper layer are unsatisfactory since they do not provide sufficient elongation to accommodate complex mold shapes which may include surfaces defined by compound curves and/or require extension of laminate portions in angularly intersecting directions.

The molding process tends to increase the adhesion or release force between the release liner and the surface to which it is secured. The exact phenomenon of the undesirable increase in release force is not known, but it is deemed to be a change in the release surface and/or silicone coating due to migration of silicone away from the release surface of the liner and/or penetration of the release surface by the pressure-sensitive adhesive.

The present invention has been found especially advantageous in the thermoforming of carpet materials including a pressure-sensitive adhesive layer for installation of the molded carpet. Various thermoforming techniques are discussed in Irwin, Dave, *Introduction to Thermoforming*, Modern Plastics Encyclopedia, pp. 286-292, 1988. In the thermoforming of carpet materials, a matched mold forming technique is used with the carpet material being shaped in a clearance between the closed mold halves. The carpet is heated to a temperature in the range of 200° F. to 450° F. and then molded at a pressure of several thousand psi. Applicants are not aware of any successful prior release liners or techniques for thermoforming a carpet, pressure-sensitive adhesive and release liner laminate.

U.S. Pat. No. 4,405,668 discloses the use of pressure-sensitive adhesive coated fiber strands embedded in the backing of carpet materials for installation thereof after removal of a polyethylene sheet release layer. This patent also proposes automotive interior applications wherein the carpet materials are molded following the removal of the polyethylene sheet release layer in order to simultaneously effect the molding and adhering of the carpet material.

U.S. Pat. No. 2,986,777 discloses a carpet molding technique for automotive interior floor carpets. The carpet is molded or shaped between mating dies to set the back of the carpet. This patent does not disclose the use of an installation adhesive for the carpet.

The use of a plastic film such as polyethylene film at a mold surface to improve the surface of a poured concrete part and better conform the part surface with the mold is disclosed in U.S. Pat. No. 4,331,628. The plastic film is heat-softened and a vacuum is applied to make the film better conform to the mold surface.

U.S. Pat. No. 2,343,930 discloses a creped web coated with plastic which is melted during molding to carry the web to a more exact mold shape. U.S. Pat. Nos. 4,350,551 and 4,443,507 disclose molding processes wherein an intermediate layer of a thermoplastic or thermosetting film is melted during the molding process to accommodate relative movement between adjacent layers.

SUMMARY OF THE INVENTION

In accordance with the present invention, the rheological properties of thermoplastics at elevated temperatures are used to achieve mold conformability and retention of uniform release characteristics in a silicone coated release liner for use in a molding process. The thermoplastic is selected so that it becomes sufficiently supple due to softening or melting to assure mold replication while limiting deformation and/or flow to thereby substantially maintain the integrity and continuity of the release surface.

The silicone coating is applied to at least one surface of a film of the thermoplastic and cured at a temperature which avoids unnecessary softening of the thermoplastic film in order to provide a uniform and continuous silicone coating. Thereafter, the liner may be exposed to relatively higher temperatures in the molding process in reliance upon the rheological properties of the thermoplastic film to maintain the integrity and continuity of the cured silicone coating. Molding temperatures exceeding the melt temperature of the thermoplastic and/or causing the melting of the film during molding have not been found to significantly increase the release force and uniform release characteristics have been maintained.

The film may include a single layer of the thermoplastic material or polymer, blends of polymers or filled polymers or consist of multiple layers including one layer that provides desired rheological and surface properties and another layer which provides physical film properties such as tear, elongation, and tensile properties. The single or multiple layer film may be produced in conventional manners such as by casting, calendering and extrusion including blown film processing. Further laminating and coextruding techniques may be used to form multiple layer films.

A wide range of thermoplastic materials may be used to provide acceptable mold conformability for molding or thermoforming operations. Acceptable mold conformability or similar phrases herein used in connection with thermoplastic films and release liners indicate the ability of such films and liners to be shaped during a molding process to substantially duplicate or replicate the mold and to be substantially free of wrinkles, folds, and other three dimensional irregularities.

The specific molding conditions may favor the use of particular thermoplastic materials. Generally, acceptable mold conformability is balanced against retention of release properties. If the deformation or flow displacement of the thermoplastic material at the molding temperature and pressure is too high, the silicone coating is disrupted and the release force may be increased to an unacceptable value in that area. If the release force is too great, manual removal of the liner from large workpieces is fatiguing and the liner may tear so as to require additional time for its removal in pieces.

A 20 to 50% increase in the release force due to the thermoforming of carpet materials has been observed by applicants prior to the development of the present invention. Such increases in the liner release force may cause the release force to become excessive and inhibit the clean separation of the liner from the pressure-sensitive adhesive. By use of thermoplastic films as described hereinafter, acceptable mold conformability may be achieved with no significant increase in the release force.

It has been found that the mold conformability of a thermoplastic film for given molding conditions is related to its deflection temperature under flexural load determined according to ASTM D648-82. This test measures the temperature at which a selected deformation occurs when a load of either 66 psi or 264 psi is applied at the midpoint of a sized beam of the thermoplastic material immersed in a heating oil medium. The deflection temperature is a measure of the softening temperature of the thermoplastic material. A higher deflection temperature indicates a decreased degree of shapeability and mold conformability at given molding conditions. Accordingly, the conformability of the release liner for a given molding process may be correlated with the deflection temperature of the thermoplastic film used in the liner. Thermoplastic films of relatively low deflection temperatures tend to give improved conformability for given molding conditions. Satisfactory results have been obtained for thermoplastic films having deflection temperatures from about 80° to 250° F. at a 264 psi load and from about 90° to 300° F. at a 66 psi load.

The integrity and continuity of the silicone coating on the thermoplastic film may be maintained during the molding process even if the thermoplastic film melts provided the melted or molten thermoplastic does not readily flow. The maintenance of the integrity and continuity of the cured silicone coating upon melting of the thermoplastic are related to the melt index of the thermoplastic. Melt index is used herein to identify the flow rate in g/10 mins. obtained with an extrusion plastometer for a thermoplastic material as determined in accordance with ASTM D1238-86, condition 190/2.16. The 190/2.16 designation indicates a measured test temperature of 190° C. and a total load including the piston weight of 2.16 kg. Decreasing melt index values reduce the risk of liner film and silicone coating degradation or disruption for given molding conditions. The melt index should be in the range of about 0.15 to about 20 g/10 min., and more preferably, in the range of from about 0.5 to about 15 g/10 min.

As indicated above, a suitable silicone coating is applied to the thermoplastic film to provide the release surface of the liner. Since the thermoplastic material is selected to become supple or melt at temperatures expected to be experienced in the molding process, the silicone cure temperature should not exceed such temperatures. Thermal curing silicones having sufficiently low curing temperatures must be used or a radiation curing silicone may be used. In the latter case, the silicone cure may be by ultraviolet or electron beam radiation.

In the drawings, which are highly schematic the thickness of the various layers is not to scale.

DETAILED DESCRIPTION OF THE INVENTION

Figure 1:
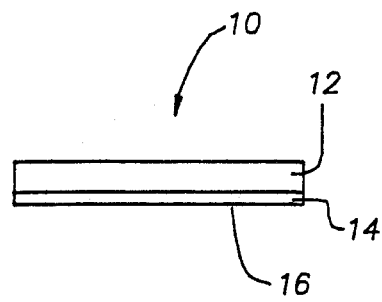
FIG. 1 is a schematic cross-section of a release liner according to the invention.

A release liner 10 according to the invention is shown in FIG. 1. The liner 10 includes a thermoplastic film or layer 12 having a silicone coating 14 applied to a surface thereof to provide a liner release surface 16. The liner 10 is generally prepared in rolls of predetermined width and indefinite length.

The film 12 is formed of a thermoplastic material having rheological properties suitable for the particular molding process. The thermoplastic material should have a deflection temperature such that the film 12 becomes sufficiently supple due to softening or melting during molding to assure conformability. On the other hand, the melt index of the thermoplastic material should be sufficiently low to prevent degradation of the release surface 16 due to excessive flow, thinning or disruption of the film 12.

Examples of suitable thermoplastic polymers or materials for use in forming the film 12 include vinyl polymers, polyolefins, polystyrenes and ionomers. Preferred thermoplastics include polyvinylchloride, polyethylene, polypropylene, polypropylene copolymers, polystyrene and ethylene/methacrylic acid copolymer ionomers. The most preferred thermoplastics comprise ethylene/methacrylic acid copolymer ionomers having a melt index in the range of 0.15 to 20, and more preferably, in the range of 0.5 to about 15. Such ionomers are sold under the trademark Surlyn by E. I. DuPont de Nemours.

The thickness of the film 12 is not very critical and may range from 2 to 20 mils. The thickness of the film 12 may be varied in order to assure adequate web handling characteristics.

The silicone coating 14 may be formed by application of commercially available thermal or radiation cure silicones to the film 14. Low curing temperature silicones are used to form the silicone coating and enable the use of thermoplastic having relative low temperature softening and melting properties for improved mold conformability. Generally, the silicone curing temperature will be less than the temperature to which the film is heated during the molding process and should not exceed the melting temperature of the thermoplastic. For this reason it may be convenient to use a radiation curable silicone wherein curing is effected at room temperature. Suitable radiation curable silicones include that sold by the Goldschmidt Company under the product designations RC 710 and RC 720.

The silicone coating 14 is applied at a weight of from about 0.2 to 6.0 grams/sq meter. Low weight thin coatings provide satisfactory retention of release values in many applications. However, improved retention of release values may be obtained by the use of heavier weight thicker coatings in some applications. As molding conditions become increasingly severe, heavier weight thicker coatings tend to become more effective in retaining release values or limiting the increases in such values.

Figure 2:
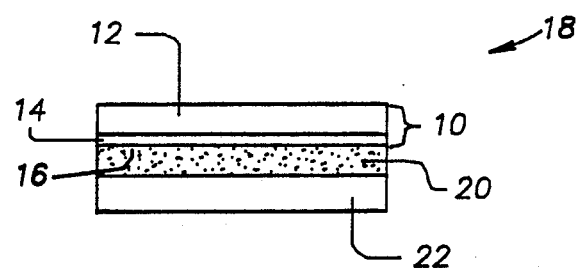
FIG. 2 is a view similar to FIG. 1 illustrating the use of the release liner shown in FIG. 1 as a principal component in a fastening tape having a double liner construction.
Figure 2A:
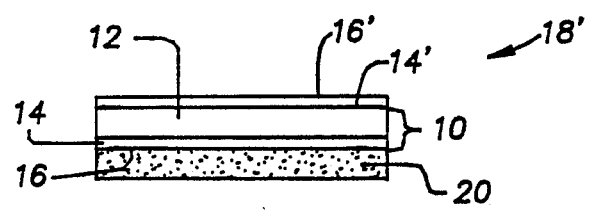
FIG. 2a is a view similar to FIG. 2 illustrating the use of the release liner shown in FIG. 1 as a principal component in a fastening tape having a self-wound construction.

Referring to FIG. 2, a simple form of a fastening tape 18 comprises a pressure-sensitive adhesive layer 20 mounted to the release surface 16 of the liner 10. The layer 20 may comprise either an acrylic or rubber based pressure-sensitive adhesive which are well known in the art. The layer 20 may be initially coated onto a paper carrier and then laminated to the liner 10. Fastening tapes are also manufactured in roll form with a predetermined width and an indefinite length. To enable self-winding of the fastening tape 18, a conventional release liner 22 comprising a silicone coated paper may be applied to the exposed surface of the layer 20 to provide a "double liner" construction. Alternatively, a second silicone coating 14' may be applied to the opposite surface of the film 12 to provide a fastening tape 18' having a self-wound construction enabled by a release surface 16' as shown in FIG. 2a. The release surface 16' has a lower release value than the release surface 16 with respect to the adhesive layer 20. Thus, the adhesive layer 20 separates from the release surface 16' during unwinding of a roll of fastening tape 18' and the silicone coating 14' remains adhered to the surface of liner 10 remote of the silicone coating 14.

Figure 3:
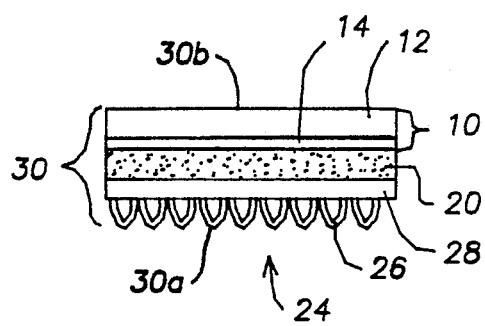
FIG. 3 is a view similar to FIG. 1 but on a smaller scale, illustrating the fastening tape shown in FIG. 2 applied to a carpet material to be thermoformed.

Referring to FIG. 3, the fastening tape 18 is shown applied to a carpet material 24. The carpet material 24 is of conventional construction and includes a fiber pile 26 secured to a backing 28, and it is manufactured and typically processed in roll form. In automotive applications, the backing 28 may comprise an extruded or heat laminated layer of polyethylene. For added dimensional stability, a nonwoven material may be embedded in the polyethylene.

The fastening tape 18 may be laminated to the carpet material 24 at room temperature. To that end, the release liner 22 is removed and the exposed surface of the pressure-sensitive adhesive layer 20 is laminated to the backing 28 of the carpet material 24. If the self-wound construction of fastening tape 18' is used, the adhesive layer 20 is exposed as the tape is unwound and it may be laminated to the backing 28. In either case, the lamination will usually be done in roll form to provide a laminate 30 of predetermined width and indefinite length. Accordingly, a workpiece or blank of the carpet laminate 30 may be cut to size, molded and subsequently adhesively mounted or installed.

The laminate 30 includes a frontside 30a comprising the fiber pile 26 and a backside 30b comprising the liner 10. The frontside 30a provides a durable and decorative surface which may be used in automotive interior applications. The liner 10 protects the adhesive layer 20 from contamination prior to installation of the laminate. During the molding process, the liner also cooperates to achieve mold conformability and retention of uniform adhesive release characteristics.

Figure 4:
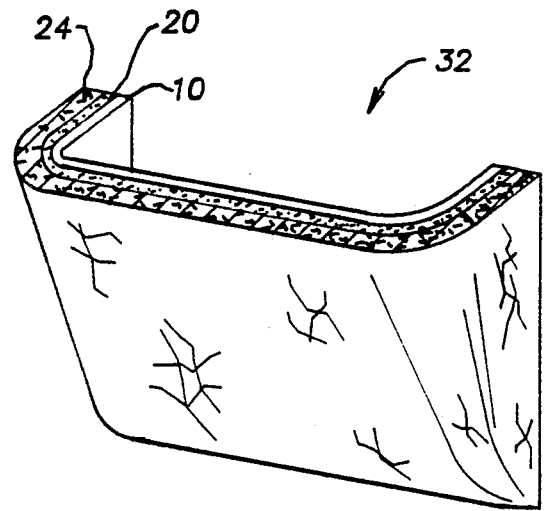
FIG. 4 is a schematic perspective view illustrating the carpet material of FIG. 3 after it has been molded to the shape of a map pocket for use in an automotive door.

Referring to FIG. 4, a molded map pocket 32 formed of the laminate 30 is shown. The map pocket 32 is prepared by initially heating a suitably sized workpiece of the laminate 30 in an oven to a temperature in the range of about 200° to 450° F. If infrared heating is used, only the backside 30b of the laminate 30 is exposed to the heaters. The heated piece of laminate 30 is then placed in a matched mold, the halves of which are closed at a pressure ranging up to several tons. The molding cycle may be from 5 to 90 seconds depending upon the construction of the particular laminate and the shape. The mold may be cooled in order to improve the retention of the molded shape. Upon removal from the mold, the laminate edges are trimmed and the molded part is completed.

As shown in FIG. 4, the map pocket 32 is ready for installation upon removal of the liner 10. The liner 10 is manually removed by pulling it from the adhesive layer 20 with separation occurring at the release surface 16. The map pocket 32 is then adhesively mounted or installed by merely pressing it against a support surface on the automobile door (not shown).

Prior to the present invention, it was not possible to mold a carpet material with a pressure-sensitive adhesive and liner to a configuration such as that of the map pocket 32. Prior art liners such as those using paper materials tended to wrinkle and otherwise form an unsatisfactory irregular surface. The prior art failure was primarily due to the compound curves of the lower corners of the map pocket 32.

Figure 5:
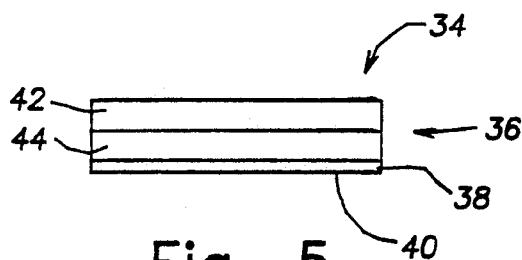
FIG. 5 is a view similar to FIG. 1 illustrating another embodiment of a release liner according to the invention.

Referring to FIG. 5, a release liner 34 includes multiple-layer thermoplastic film 36, silicone coating 38 and release surface 40. The film 36 includes first and second layers 42 and 44 of different thermoplastic materials.

The layers 42 and 44 are securely joined together. To that end, the film 36 may be produced by laminating or coextruding the layers. The layers 42 and 44 may each be made of the thermoplastic materials as described above with respect to the film 12.

The properties of the film 36 will be a composite of the properties of the layers 42 and 44. For example, the layer 44 may be of a Surlyn thermoplastic material in order to achieve optimum surface-type characteristics in respect to the maintenance of the release surface 40. The layer 42 may be a polyethylene which provides satisfactory bulk film properties at a relatively lower cost as compared with Surlyn. The combination of Surlyn and the polyethylene may be coextruded. Of course, combinations of other thermoplastic materials or blends or multiple layers may be used.

In accordance with the present invention, release liners including a thermoplastic film of Surlyn 1601 were prepared and evaluated in a test molding procedure as described below. The results of these tests are reported in Table I.

In the following Examples 1 to 4, a six mil thick film of Surlyn 1601, commercially available from suppliers such as Consolidated Thermoplastics Films of Arlington Heights, Ill., was provided with a radiation curable silicone coating using conventional coating techniques. The silicone coating comprised a 55/45 weight percent blend of radiation curable silicones sold by the Goldschmidt Company with product designations RC 710 and RC 720. The silicone coating was cured by electron beam at 175 kv energy and a 3.0 mega rad dose. In this manner, a 2.5 g/sq. meter silicone coating was provided on one side of the Surlyn film to form a release surface. In Examples 2 and 4, a 2.5 g/sq. meter cured coating comprising a 30/70 weight percent blend of RC 710 and RC 720 was provided on the opposite side of the film to make a self-wound construction of the type shown in FIG. 2a of the drawings. In Examples 1 and 3, a silicone-coated paper release liner was used to provide a double liner construction as generally illustrated in FIG. 2 of the drawings.

In all of the examples, a proprietary rubber based adhesive as indicated in Example 5 of U.S. Pat. No. 4,820,746 was used. The adhesive was double coated onto the silicone coating of the paper release liner in an amount sufficient to provide a total adhesive weight of about 250 g/sq. meter.

The silicone coated release surface of the Surlyn film of Examples 1 and 3 was laminated at room temperature to the cured adhesive layer on the paper release liner, and the resulting laminate was wound to provide the double liner roll stock. In Examples 2 and 4, the release surface provided by the 55/45 blend of RC 710 and RC 720 silicone coating was similarly laminated to the adhesive layer on the paper release liner. The paper release liner was then separated since the laminate was a self-wound construction.

The release liners of Examples 1-4 were applied to an automotive grade carpet material having a 12 oz/yd² nonwoven needlepunch polypropylene fiber pile and a 10 mil thick backing of polyethylene having a polyester nonwoven laminated to its backside. (In the case of Examples 3 and 4, the silicone paper liner was removed and the exposed pressure-sensitive adhesive layer was applied to the carpet backing.) In all cases, the liners were applied using a nip roll at room temperature. Thereafter, the carpet and liner laminate was heated in an oven at 280° F. for one minute and then immediately placed in a mold at 2,000 psi for one minute in order to allow cooling of the laminate. In each of the examples, the Surlyn film was deemed to have melted during processing since Surlyns have melt points less than 210° F.

TABLE I

| Example | Release Force[1] (g/2" width) | |
|---------|-----------------|---------------|
|         | Before Molding  | After Molding |
| 1       | 137             | 137           |
| 2       | 158             | 163           |
| 3       | 327             | 400[2]        |
| 4       | 256             | 228           |

[1]Reported in grams/2" wide sample per TLMI tester.
[2]Silicone coating was not uniform.

As indicated in Table I, the release force was measured before and after molding using PSTC-2 test procedure as set forth in Pressure Sensitive Tape Council Test Methods, 5th Edition. A Tag and Label Manufacturing Institute (TLMI) release and adhesion tester was used and the samples were tested at 300 in/min.

In all of the examples, no significant increase in the release force was observed due to the molding process. The release force in Example 4 is considered to be constant; the slight decrease in value after molding is within testing variation. Increases in the release force due to the molding process may be acceptable provided the release force does not become excessive in the further processing. For example, release forces in excess of 600 g/2" sample width tend to inhibit manual removal of a liner from larger workpieces.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. A release liner having improved mold conformability for use in a laminate including a formable layer comprising a carpet backing and a pressure-sensitive adhesive layer to be molded at an elevated temperature in a mold, said release liner including a film of thermoplastic material or blends of materials having a release surface including a cured silicone coating for releasable attachment to said adhesive layer with a release force value or range of values prior to molding, said silicone coating being cured at a temperature less than said elevated temperature, said film having a deflection temperature in the range of from about 80° F. to about 250° F. at a 264 psi load or in the range of from about 90° F. to about 300° F. at a 66 psi load and a melt index in the range of from about 0.15 g/10 min. to about 20 g/10 min., such that said film becomes supple during molding to conform with the mold while limiting the deformation and flow of the thermoplastic film to substantially prevent degradation of said release surface and thereby to substantially maintain said releasable attachment with said release force value or range of values.

2. A release liner according to claim 1, wherein said silicone coating is cured by radiation.

3. A release liner according to claim 1, wherein said film has a melt temperature less than said elevated temperature and melts during molding.

4. A release liner according to claim 2, wherein said thermoplastic material is selected from the group consisting of vinyl polymers, polyolefins, polystyrenes and ionomers.

5. A release liner according to claim 1, wherein said film includes at least two layers of different thermoplastic materials.

6. A release liner according to claim 2, wherein said film includes first and second layers, said first layer including said release surface and primarily providing said film with rheological characteristics to substantially prevent degradation of said release surface at said elevated temperature, and said second layer primarily provides said film with improved physical film properties selected from the group consisting of tear, elongation and tensile properties.

7. A release liner according to claim 2, wherein said film comprises first and second layers of thermoplastic materials, said first layer being a layer of ethylene/methacrylic acid copolymer ionomer, and said second layer being a layer of polyethylene, said first layer providing said release surface at a side thereof remote from said second layer.

8. A release liner according to claim 2, wherein said thermoplastic material is an ethylene/methacrylic acid copolymer ionomer having a melt index in the range of from about 0.5 g/10 min. to about 15 g/10 min.

9. A release liner according to claims 1, 2 or 3 wherein said carpet backing comprises a backing layer of polyethylene.

10. A release liner according to claim 9, wherein a nonwoven material is embedded in or laminated to said backing layer of polyethylene.

11. A release liner according to claim 9 wherein said carpet backing is secured to a fiber pile to provide an automotive carpet material.

12. A release liner having improved mold conformability for use in a laminate including a formable layer and a pressure-sensitive adhesive layer to be molded at an elevated temperature in a mold, said release liner including a film of thermoplastic material or blends of materials having a release surface including a cured silicone coating for releasable attachment to said adhesive layer with a release force value or range of values prior to molding, said silicone coating being cured at a temperature less than said elevated temperature, said film having a deflection temperature in the range of from about 80° F. to about 250° F. at a 264 psi load or in the range of from about 90° F. to about 300° F. at a 66 psi load and a melt index in the range of from about 0.15 g/10 min. to about 20 g/10 min. such that said film becomes supple during molding to conform with the mold while limiting the deformation and flow of the thermoplastic film to substantially prevent degradation of said release surface and thereby to substantially maintain said releasable attachment with said predetermined release force value or range of values.

13. A release liner according to claim 12, wherein said silicone coating is cured by radiation.

14. A release liner according to claim 12, wherein said film has a melt temperature less than said elevated temperature and melts during molding.

15. A release liner according to claim 12, 13 or 14 wherein said thermoplastic material is selected from the group consisting of vinyl polymers, polyolefins, polystyrenes and ionomers.

16. A release liner according to claim 12, wherein said film includes at least two layers of different thermoplastic materials.

17. A release liner according to claim 12, 13 or 14 wherein said film includes first and second layers, said first layer including said release surface and primarily providing said film with rheological characteristics to substantially prevent degradation of said release surface at said elevated temperature, and said second layer primarily provides said film with improved physical film properties selected from the group consisting of tear, elongation and tensile properties.

18. A release liner according to claim 12, 13 or 14 wherein said film comprises first and second layers of thermoplastic materials, said first layer including said release surface and being a layer or an ethylene/methacrylic acid copolymer ionomer, and said second layer being a layer of polyethylene.

19. A release liner according to claim 12, 13 or 14 wherein said thermoplastic material is an ethylene/methacrylic acid copolymer ionomer, and said melt index is in the range of from about 0.5 g/10 min. to about 15 g/10 min.

20. A release liner according to claim 12, wherein said formable layer comprises a carpet backing.

21. A release liner according to claim 20, wherein said carpet backing is secured to a fiber pile to provide an automotive grade carpet.

* * * * *